United States Patent
Karnik et al.

(10) Patent No.: US 11,531,757 B2
(45) Date of Patent: Dec. 20, 2022

(54) RANSOMWARE DETECTION AND MITIGATION

(71) Applicant: McAfee, LLC, San Jose, CA (US)

(72) Inventors: Abhishek Karnik, Portland, OR (US);
Xiaobing Lin, Hillsboro, OR (US);
Asheer Malhotra, Laurel, MD (US);
Oliver G. Devane, Upton (GB)

(73) Assignee: McAfee, LLC, San Jose, CA (US)

( * ) Notice: Subject to any disclaimer, the term of this patent is extended or adjusted under 35 U.S.C. 154(b) by 181 days.

(21) Appl. No.: 16/711,819

(22) Filed: Dec. 12, 2019

(65) Prior Publication Data

US 2021/0182397 A1   Jun. 17, 2021

(51) Int. Cl.
*G06F 21/56* (2013.01)
*G06F 21/60* (2013.01)
*H04L 9/40* (2022.01)

(52) U.S. Cl.
CPC .......... *G06F 21/568* (2013.01); *G06F 21/561* (2013.01); *G06F 21/564* (2013.01); *G06F 21/565* (2013.01); *G06F 21/566* (2013.01); *G06F 21/602* (2013.01); *H04L 63/1416* (2013.01); *H04L 63/1441* (2013.01); *H04L 63/20* (2013.01); *G06F 2221/2107* (2013.01)

(58) Field of Classification Search
CPC .... G06F 21/564; G06F 21/566; G06F 21/565; G06F 21/602; G06F 21/561; G06F 21/568; G06F 2221/2107; H04L 63/1416; H04L 63/20; H04L 63/1441
See application file for complete search history.

(56) References Cited

U.S. PATENT DOCUMENTS

| | | | |
|---|---|---|---|
| 10,121,003 B1* | 11/2018 | Adams | G06F 21/565 |
| 2019/0108340 A1* | 4/2019 | Bedhapudi | G06F 21/554 |
| 2019/0109870 A1* | 4/2019 | Bedhapudi | H04L 63/0428 |
| 2019/0121978 A1* | 4/2019 | Kraemer | G06F 21/554 |
| 2019/0158512 A1* | 5/2019 | Zhang | H04L 63/145 |
| 2020/0128028 A1* | 4/2020 | Hittel | H04L 63/1433 |
| 2020/0387609 A1* | 12/2020 | Hansen | G06F 21/552 |
| 2021/0097181 A1* | 4/2021 | Reid | G06F 21/554 |

* cited by examiner

*Primary Examiner* — Matthew Smithers
*Assistant Examiner* — Shu Chun Gao
(74) *Attorney, Agent, or Firm* — Patent Capital Group

(57) ABSTRACT

There is disclosed in one example a computing apparatus, including: a hardware platform including a processor and a memory; a system profile store; and a ransomware detection engine including instructions encoded within the memory to instruct the processor to: detect an operation, by a process, that results in an operation on a file, wherein the operation includes newly creating the file including a file type identifier, or where the file is an existing file, changing a file type identifier for the file; querying the system profile store with a combination of the file type identifier and metadata about the file; based at least in part on the querying, determining that the process is a suspected ransomware attack; and taking a remedial action.

20 Claims, 13 Drawing Sheets

RANSOMWARE DETECTION AND MITIGATION

FIELD OF THE SPECIFICATION

This application relates in general to computer security, and more particularly, though not exclusively, to a system and method for providing ransomware detection and mitigation.

BACKGROUND

Ransomware is a growing threat for individual computer users and enterprises.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
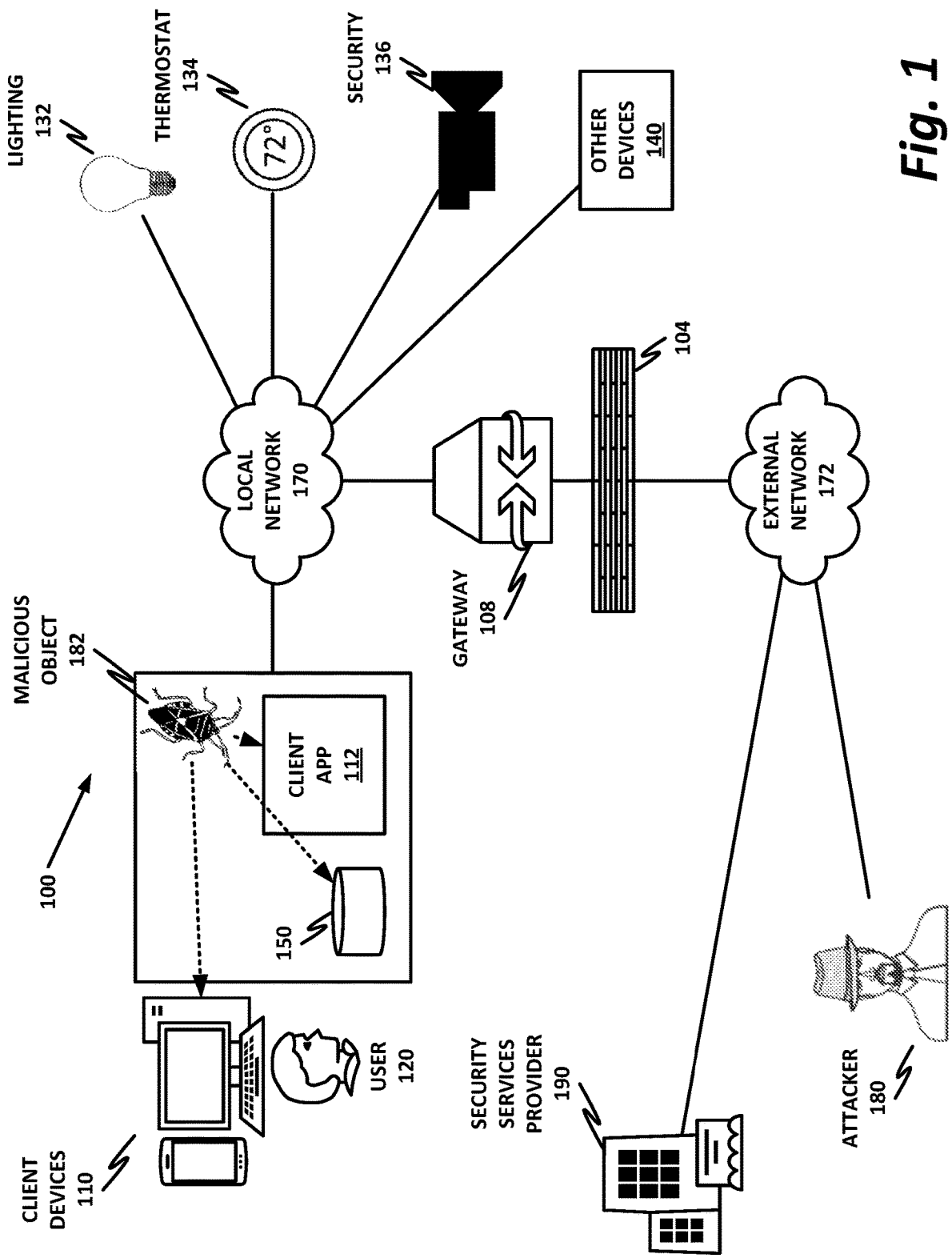
FIG. 1 is a block diagram illustrating selected elements of a security ecosystem.

In an example, there is disclosed a computing apparatus, comprising: a hardware platform comprising a processor and a memory; a system profile store; and a ransomware detection engine comprising instructions encoded within the memory to instruct the processor to: detect an operation, by a process, that results in an operation on a file, wherein the operation comprises newly creating the file including a file type identifier, or where the file is an existing file, changing a file type identifier for the file; querying the system profile store with a combination of the file type identifier and metadata about the file; based at least in part on the querying, determining that the process is a suspected ransomware attack; and taking a remedial action.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Ransomware attacks are a style of attack that is growing in popularity. Ransomware involves an attacker gaining access to a user's computer system and, in the background, encrypting important files. Once a sufficient number of important files have been encrypted, the ransomware attack sends a notification to the user demanding payment (often in Bitcoin or other cryptocurrency), in exchange for providing the ransomware decryption key. Thus, the user is denied access to his or her important files until he or she has paid the ransom and received the decryption key.

Effective ransomware often uses strong encryption that is difficult or impossible to break with contemporary computing systems. One traditional guard against ransomware is the use of a continuous versioning backup system. For example, services such as Carbonite, CrashPlan, Microsoft OneDrive, ownCloud, Nextcloud, and similar can be used to back up files. Most of these services will save several previous versions of the file. So in those cases, even after being hit with ransomware, the user can restore the backup version of the file, and thus recover a good version without paying the ransom. But some recent attacks target even these backup services. For example, the relatively recent NextCry ransomware attacks certain Linux-based Nextcloud servers and encrypts the backups. In this case, once the backup has been encrypted, the synchronization service will push the encrypted version out to the endpoint, so that the good version of the file is overwritten with the encrypted version that was corrupted on the Nextcloud server. Thus, the end user loses access to the good file in both locations. While developers will certainly patch known vulnerabilities that make specific attacks (such as NextCry) possible, attackers will continue to search for and locate new vulnerabilities, which will then have to be patched. This effectively creates an arms race between security actors and ransomware attackers.

Ransomware is used by malicious actors to extort individuals and target corporations. The ransomware may spread throughout a network and encrypt files on multiple devices. In extreme cases, this may result in businesses or enterprises shutting down their networks to stop the spread of the virus. If the ransomware attack is successful, then the enterprise may completely lose access to certain critical files unless it pays the ransom. When ransomware attackers see that their efforts are successful, they generally become more bold, and demand more money for their ransoms.

Because ransomware can be a substantial threat to both individuals and enterprises, it is desirable to timely identify endpoints or nodes that are infected with a ransomware attack on an organization's network. In some cases, this is an important consideration in the incident response (IR) process. Early identification of infected endpoints enables IR teams to isolate infected systems and contain the spread of ransomware on the network. This activity enables organizations to continue business operations and provide more resilient networks that are resistant to ransomware outbreaks.

A common behavior of a ransomware attack is to modify both the contents and the extension of a file that has been attacked. This enables the ransomware decryptor tool to identify and decrypt the infected files. This may be an important factor for ransomware attackers, because if the ransomware victim does not credibly believe that the ransomware attacker is able and willing to repair the damage, there is no motivation to pay the ransom. If the ransomware attack cannot reverse its damage, then the attacker has effectively lost its bargaining power.

A ransomware detection and mitigation system of the present specification includes both server-side and endpoint mechanics that can detect these ransomware attacks in their early stages, and perform remedial action. For example, when a ransomware attack is identified, the endpoint may be isolated from the rest of the network (e.g., by disabling its network interface). In an enterprise, this may effectively contain the ransomware, because it will not be able to propagate out to other endpoints. Importantly, it will also not be able to attack the unencrypted backups. When the attack is thus effectively contained, it may be relatively straightforward for the enterprise to restore the infected system from a known good backup, with little or no disruption to enterprise operations.

In an embodiment, endpoints are provisioned with a security agent that includes a ransomware detection engine. The ransomware detection engine profiles a computer system (such as an endpoint), and builds a list of known file extensions. The ransomware detection engine maintains a profile store that includes the first four bytes of an application of each extension. These first four bytes are known as "magic bytes," and contain metadata about the extension type. The profile store may maintain a list of known file extensions, along with the first four bytes, or a hash or other signature of the first four bytes. This correlation is used to properly identify files of the correct extension.

The profile store may be used to determine if a machine has been compromised by ransomware. For example, a ransomware detection engine may detect that multiple new file extensions have been created, or that new file extensions are being created and the first four bytes no longer match the magic bytes or signature of the magic bytes, as saved in the profile store.

The frequency of file types being modified by a process may also be recorded. This information may be used in conjunction with historical file modification frequencies, or other heuristics, to determine if the number and frequency of modifications or file creations done by a process go beyond a heuristic or other threshold.

Once it is determined that a machine has been compromised, remedial action may be taken. For example, the endpoint may be isolated from the network so that the ransomware is not able to move laterally or vertically and compromise other machines, or to compromise servers (especially backups).

Metadata associated with the detected process may be sent to a cloud service provider before isolation occurs, so that the information may be used to improve profiles and better detect events on other endpoints, or within other enterprises.

Advantageously, the method described herein can work on various different types of endpoints, such as development machines, office workstation machines, and general home use machines, among others. It is expected that different types of machines will have different profiles. For example, a machine used for application development may see a large number of new files created in a short time, as the machine compiles source code into object code, links, and executables. However, it will be expected that the magic bytes for these new files will match the known extensions, and that these will not include new extensions that have never been seen on the machine. In other words, the development machine may create a large number of ".o" or ".obj" files that correspond to files with the same names ending in ".cpp" or ".java." On an office machine, this behavior may appear suspicious. But on a development machine, the profile may include the creation of such files at a particular frequency as normal behavior.

The method disclosed herein also recognizes that a variety of operating systems may be developed on an organization's network. The system may account for multiple natively executable and non-executable file types, while being agnostic of file formats on an endpoint.

Advantageously, the mechanism described herein does not rely on ransomware signatures, as may be required for a traditional antivirus-type system. Thus, the method disclosed herein does not require a new content stream. However, it should be noted that the ransomware detection engine disclosed in the present specification may be used with a broader security agent that may include a signature-based ransomware detection or antivirus engine. The two methods are not mutually exclusive, but rather may be used to reinforce one another.

Further advantageously, the method described herein prevents the infection of other machines and servers on a network by isolating compromised devices. Because the system uses profiling, it can work on devices used for multiple different types of attacks.

A system and method for providing ransomware detection and mitigation will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In at least some embodiments, selected elements of a ransomware protection engine may be provided within security ecosystem 100, which may be configured or adapted according to the teachings of the present specification.

In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172.

A security services provider 190 may provide services to local network 170, such as security software, security updates, network appliances, or similar. Security services provider 190 may provide cloud-based security services, including cloud-based profiles of ransomware attacks and of different types of machines such as development machines, office machines, personal use machines, and other profiles. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Malicious object 182 may be a ransomware attack, as described in the present specification. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

In a case where malicious object 182 is a ransomware attack, it may for example exploit a flaw in client application 112 to attack storage 150. Malicious object 182 may attempt to encrypt files on client devices 110, and then to extort user 120 into paying a ransom to recover the files. If client devices 110 are attached to an enterprise network, the danger may be even greater, because malicious object 182 may seek to propagate over the network and to infect other devices within the network. Furthermore, in some examples, malicious object 182 may also attempt to propagate out to a backup solution and to infect backup files, to remove the ability of user 120 to restore the files from a good backup version.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
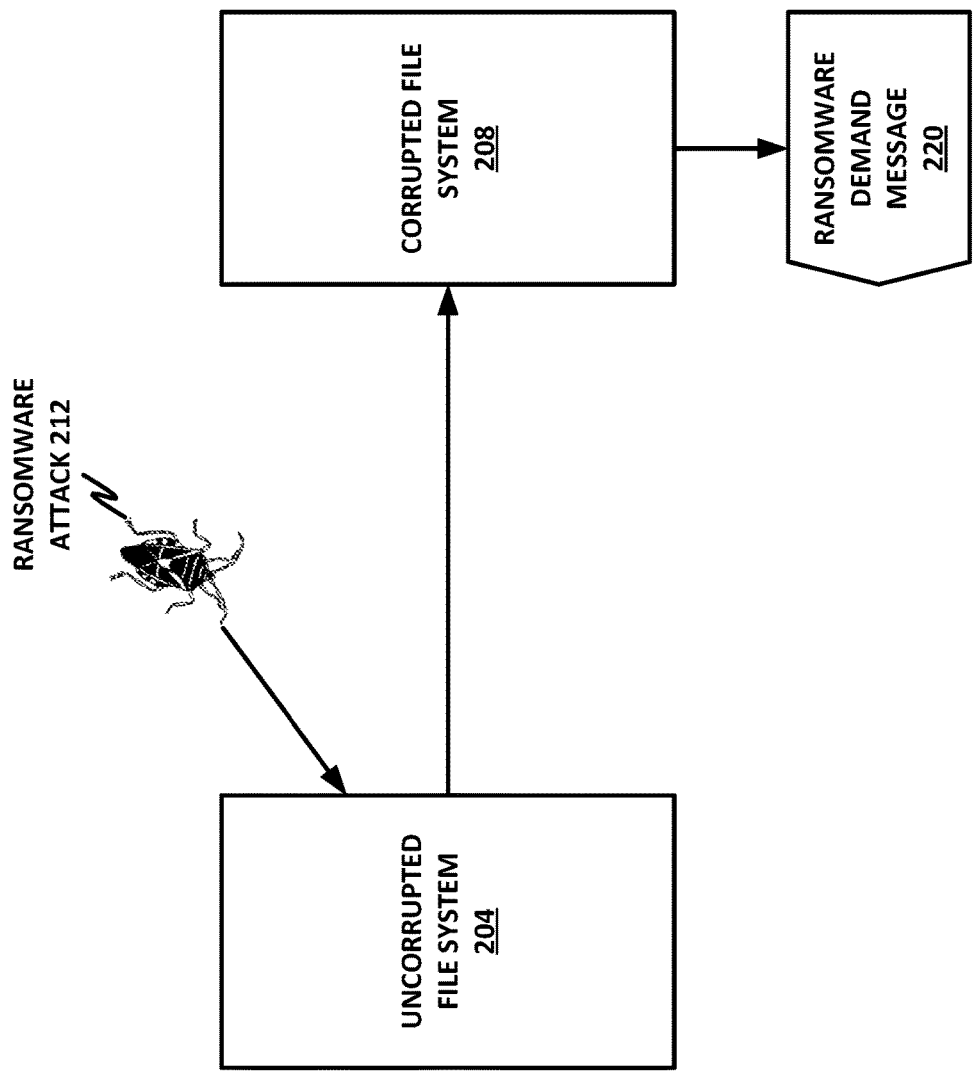
FIG. 2 is a block diagram of a ransomware attack.

FIG. 2 is a block diagram of a ransomware attack 212. Ransomware attack 212 may be launched by an attacker, such as attacker 180 of FIG. 1, whose goal is to extort money, information, or other valuable resources from a user such as user 120 of FIG. 1. The attacker 180 may deploy ransomware attack 212 on a device such as client devices 110, gateway 108, and/or server devices. In some cases, ransomware attack 212 may attempt to propagate itself over a network such as local network 170 of FIG. 1. The goal is to infect as many machines as possible to maximize the ransom demand, and also to reduce the probability that the ransom demand can be circumvented by retrieving a known good backup from another source.

In this example, an uncorrupted file system 204 stores files that the user needs access to. These files may represent substantial individual or enterprise work, and also may include valuable information such as trade secrets, intellectual property, classified data, or similar. Although it is possible for the attacker to try to harvest at least some of these files, a classic ransomware attack such as ransomware attack 212 does not need to harvest the files and upload them to a remote server operated by the attacker. Rather, the ransomware attack encrypts the files in place to create corrupted file system 208. When at least some files are corrupted in place, the user loses access to the previous good versions of the files, and then receives a ransomware demand message 220. Ransomware demand message 220 may demand that the user transfer money to the attacker, in exchange for a decryption key that can be used to decrypt the encrypted files. To maximize the value of the ransomware demand, ransomware attack 212 may specifically target files that are frequently used, and are thus more likely to be of immediate value to the user. The attack may also, for example, target larger files, on the theory that these larger files may contain more data, or may target files in particular folders where valuable data are likely to be stored.

For ransomware attack 212 to be effective, ransomware demand message 220 must be credible. In other words, the end user must credibly believe that if he provides the demanded value (e.g., Bitcoin) to the attacker, that he will in fact receive a valid decryption key, and that the decryption key will decrypt his files and restore access to them. If the end user does not credibly believe that the ransomware demand will be effective, then he has no motivation to provide the compensation and the ransomware attack fails, even though it successfully encrypted the user's files to create corrupted file system 208.

Figure 3:
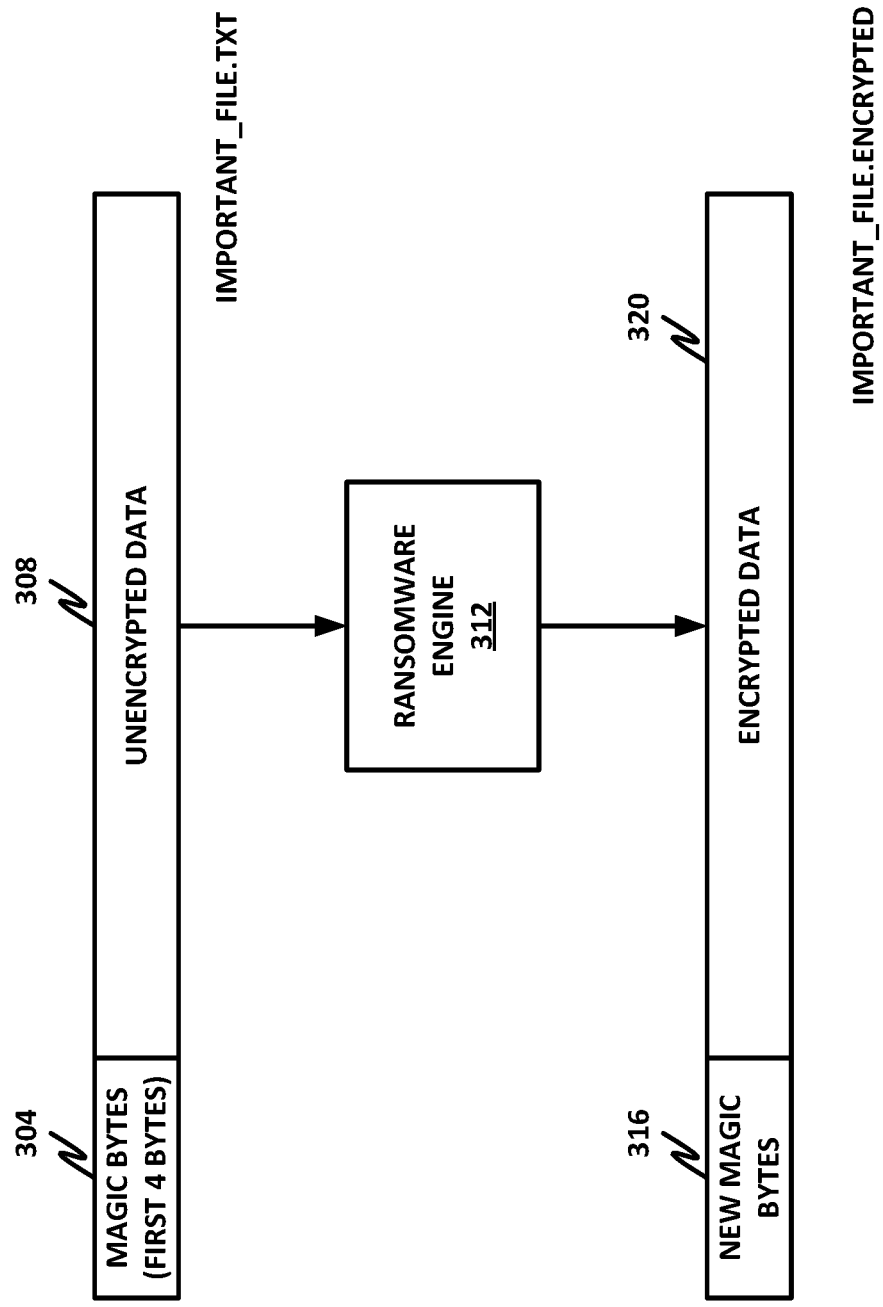
FIG. 3 is a block diagram illustrating selected aspects of a ransomware attack.

FIG. 3 is a block diagram illustrating selected aspects of a ransomware attack. In this example, the user has an important file called "important_file.txt." Important_file.txt contains some valuable information to the end user that the user wants to maintain access to. The file includes magic bytes 304, which in common contemporary practice are the first four bytes of the file. These magic bytes do not contain the file information, itself, but rather contain information about the file type. In common contemporary practice, magic bytes 304 will be identical for every file of the same file type. After magic bytes 304, unencrypted data 308 contains the actual data that the user wants to have access to. Unencrypted data 308 implies simply that the data are accessible to the end user. Even if the data are encrypted, they are encrypted in a way that the end user has access to them. For example, the data may be encrypted, but the end user has the decryption key that can be used to decrypt the file.

Ransomware engine 312 identifies important_file.txt as a file that may be of interest or that may be valuable, and determines that it will be encrypted as part of the ransomware attack. Ransomware engine 312 then yields important_file.txt.encrypted. The new .encrypted extension identifies the file to the ransomware engine 312 as a file that has been attacked by ransomware engine 312, and that will need to be decrypted later. This identification of important_file.txt.encrypted may be important to the ransomware attacker, because if the ransomware attacker cannot credibly decrypt the file, then there is no motivation for the end user to pay the ransom.

In this case, encrypted data 320 include a header 316 with new magic bytes. In some examples, ransomware engine 312 may maintain magic bytes 304 that correspond to the .txt file type. However, the file now has the extension .encrypted, identifying it as an encrypted file for the ransomware engine. Thus, there is a mismatch between the magic bytes and the file type for this file.

Figure 4:
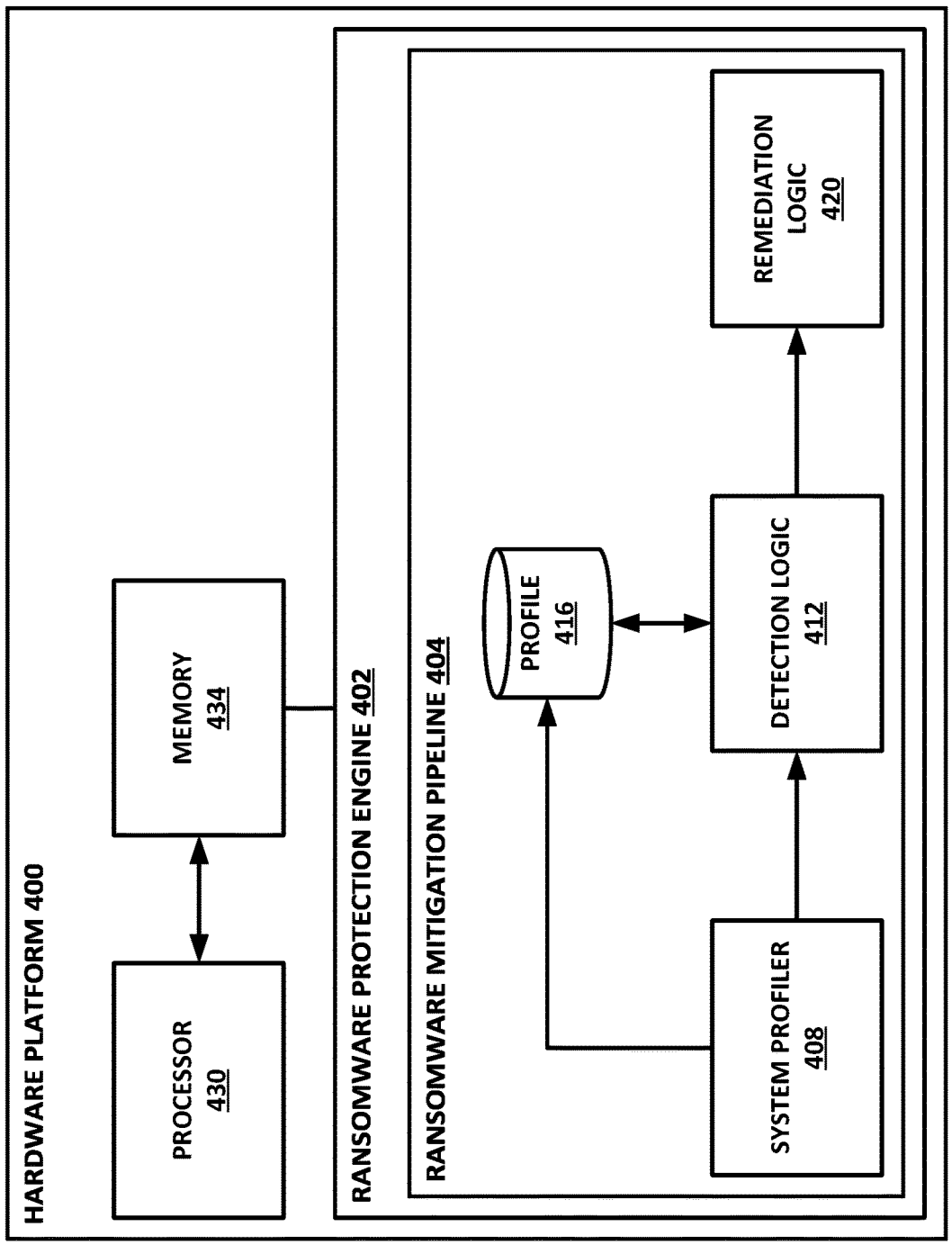
FIG. 4 is a block diagram of a hardware platform.

FIG. 4 is a block diagram of a hardware platform 400. In this case, hardware platform 400 includes a ransomware protection engine 402, including a ransomware mitigation pipeline 404.

In this illustrative embodiment, ransomware protection engine 402 may be provided as a series of executable instructions within memory 434. These instructions, when executed, instruct processor 430 to perform certain actions. In some cases, the instructions of ransomware protection engine 402 may originally be stored on some medium, such as a tangible and/or non-transitory computer-readable storage medium. At execution time, processor 430 may fetch these instructions from the storage and load them into memory 434. Processor 430 may then iterate through the instructions within memory 434, and execute the instructions to provide ransomware protection engine 402.

In this example, ransomware protection engine 402 includes a ransomware mitigation pipeline 404. Ransomware mitigation pipeline 404 includes a series of instructions that are carried out in a sequence, to provide the ransomware detection and mitigation services of ransomware protection engine 402. Note that the blocks provided within ransomware mitigation pipeline 404 are provided by way of illustration only, and are not intended to imply that the identical blocks must be provided in each instance or embodiment. Rather, these are provided as an illustration of a sequence that is useful for ransomware detection and mitigation. Furthermore, the divisions between the various blocks within ransomware mitigation pipeline 404 need not be strictly observed. In various embodiments, the logic for the various blocks may span more than one block, multiple blocks may be condensed into a single block, or other arrangements may be made. In general, the blocks illustrated within ransomware mitigation pipeline 404 are conceptual, and are provided to illustrate the operational principles of the present specification.

Ransomware mitigation pipeline 404 starts with a system profiler 408. System profiler 408 creates a profile 416 for the individual system. System profile 416 may include the file extensions for known file types provided on hardware platform 400, the magic bytes for those known file extensions (or a hash or other fingerprint for those magic bytes), and general heuristic information. Heuristic information in system profile 416 may include information such as how common it is for this particular hardware platform 400 to experience the creation of a large number of files in a short time, to create (or appear to create) new files with new extensions from existing files (e.g., compiling a .cpp file into a .obj file), how quickly such action is expected, and other information about the usage of hardware platform 400.

System profiler 408 may then hand over control to detection logic 412. Detection logic 412 accesses profile 416, and then monitors activity within hardware platform 400 to determine whether activity within hardware platform 400 appears to be consistent with profile 416. This monitoring may, in one embodiment, include determining whether a large number of files are being created with new extensions, whether the "parent" files are being deleted, the time between such file creations, the number of files created, and other similar data. The result of detection logic 412 is either a detection or a non-detection.

In the case of a detection, detection logic 412 may then pass control to remediation logic 420. Remediation logic 420 can take remedial action on the system. Remedial action may include, by way of illustrative and nonlimiting example, isolating hardware platform 400 by disabling a network interface, or taking other remedial action such as notifying the user, notifying an enterprise security administrator, quarantining software, halting the process originating the action, or performing some other remedial action.

Figure 5:
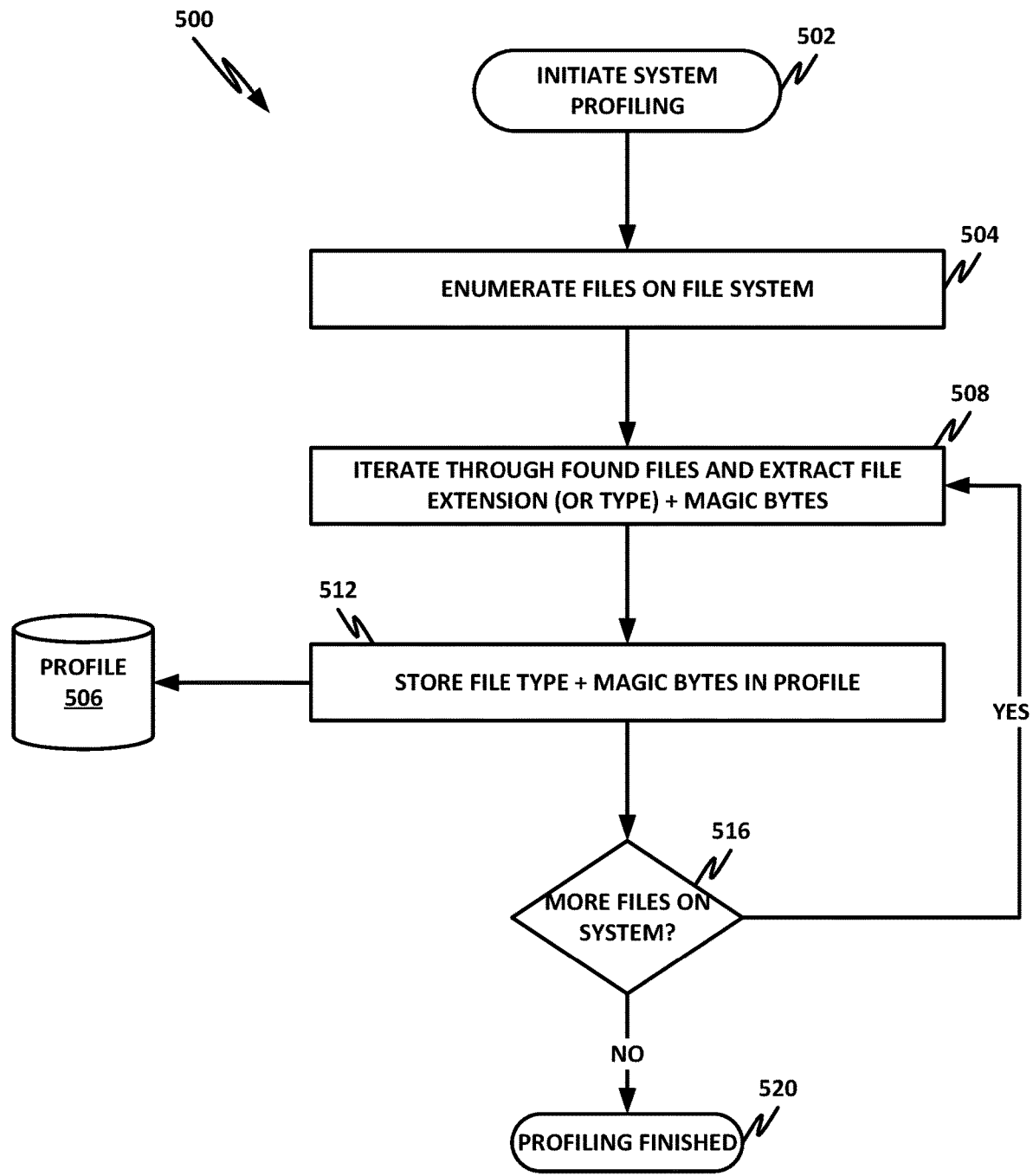
FIG. 5 is a flowchart of method of profiling a system in conjunction with a ransomware detection method of the present specification.

FIG. 5 is a flowchart of method 500 of profiling a system in conjunction with a ransomware detection method of the present specification.

When a ransomware detection and mitigation engine is first deployed on a target system, such as an endpoint or a server, it may initially profile the system that it is deployed on. In an illustrative example, this is done by building a list of known file extensions, along with the first four bytes ("magic bytes") associated with the file extension. These data may be stored in a local storage, such as a database or a cache. This may be referred to as a profile store, such as profile store 506. The profile store may include the correlation between the file extension and the magic bytes for the file. In some cases, the magic bytes are hashed, indexed, or otherwise fingerprinted. In some examples, a hash table may be made in which a hash of the magic bytes is used as an index into the file extension. To ensure that a file extension matches its magic bytes in a file under analysis, the magic bytes may be hashed from the file under analysis. This hash can then be used as an index into a hash table in profile store 506, and the resulting file extension can be compared to the file extension of the file under analysis. If the file extensions match, then it is assumed that the magic bytes also match. A system such as an endpoint or a server running a ransomware detection engine can use this method in its monitoring and detection process to determine if the machine has been compromised.

In various embodiments, the system may be re-profiled at any suitable time. This may be done, for example, after new software is installed, which may create new file types that have not previously been encountered on the system. A re-profile may also occur after false positive events, in which legitimate processes create files with new extensions and new magic bytes at the beginning of the file. If this occurs and is identified as a potential ransomware event, and it is later verified that the event was not a ransomware attack, then a re-profile may occur to prevent similar false positives in the future.

Method 500 begins with block 502, in which a suitable stimulus initiates a system profiling event. This could be the original installation of a ransomware detection engine, or another event that causes a system profile such as installation of new software, a false positive event, or some other stimulus that initiates a profile event.

In block 504, the ransomware detection engine enumerates files available on the file system. In some examples, this includes scanning every available file on the file system to identify "known" file extensions.

In block 508, the system iterates through the file or files enumerated in block 504, and extracts the file extension (or alternatively, file type), along with the first four bytes known as the "magic bytes." Note that on some operating systems, such as some Macintosh operating systems, the file extension is not used as a file type identifier. Furthermore, on other systems, and in particular Unix-based systems, so-called "dotfiles" are hidden files whose file names begin with a period. In that case, the entire file name may be treated as a file extension. However, in some cases, these dotfiles have a further extension, in which case that extension may be used. On a Unix system, when a dotfile is encountered without an additional extension, it may be identified simply as a dotfile. If the dotfile has an extension, then that extension is used as the file type. In Microsoft Windows operating systems, everything after the last "dot" in the file name is definitively treated as the file type identifier. Thus, in a Microsoft Windows system, even a dotfile is treated as a file name with an extension, where in this case the file name is blank.

It should also be noted that on a Macintosh operating system, where the file extension is not necessarily used as a file type identifier, a ransomware attack may nevertheless append a new file extension to the file name to identify the file as one that has been successfully encrypted by the ransomware engine. In that case, there is still the potential for a mismatch between a file name extension and the magic bytes.

In block 512, once the system has identified the file types and their associated magic bytes, these are stored in profile store 506.

In decision block 516, the system determines whether there are more files on the system to continue profiling. If there are more files to profile, then control returns to block 508, and additional profiling occurs.

It should be noted that in some cases, profiling may also involve collecting heuristic data on system usage, which may occur in parallel to or separate from the specific operations illustrated in method 500. In some examples, these heuristic data may also be stored in profile store 506. In other embodiments, heuristic data may be stored separately, in a separate heuristic data store. In those cases, profile store 506 may be deemed to include both a heuristic data store and a file type extension store.

Returning to decision block 516, if there are no more files to profile, then in block 520, the profiling is finished and method 500 is done.

Once the system under analysis has been profiled according to method 500, the monitoring or detection phase of the method may proceed. This is illustrated in FIGS. 6a, 6b, and 6c.

Figure 6A:
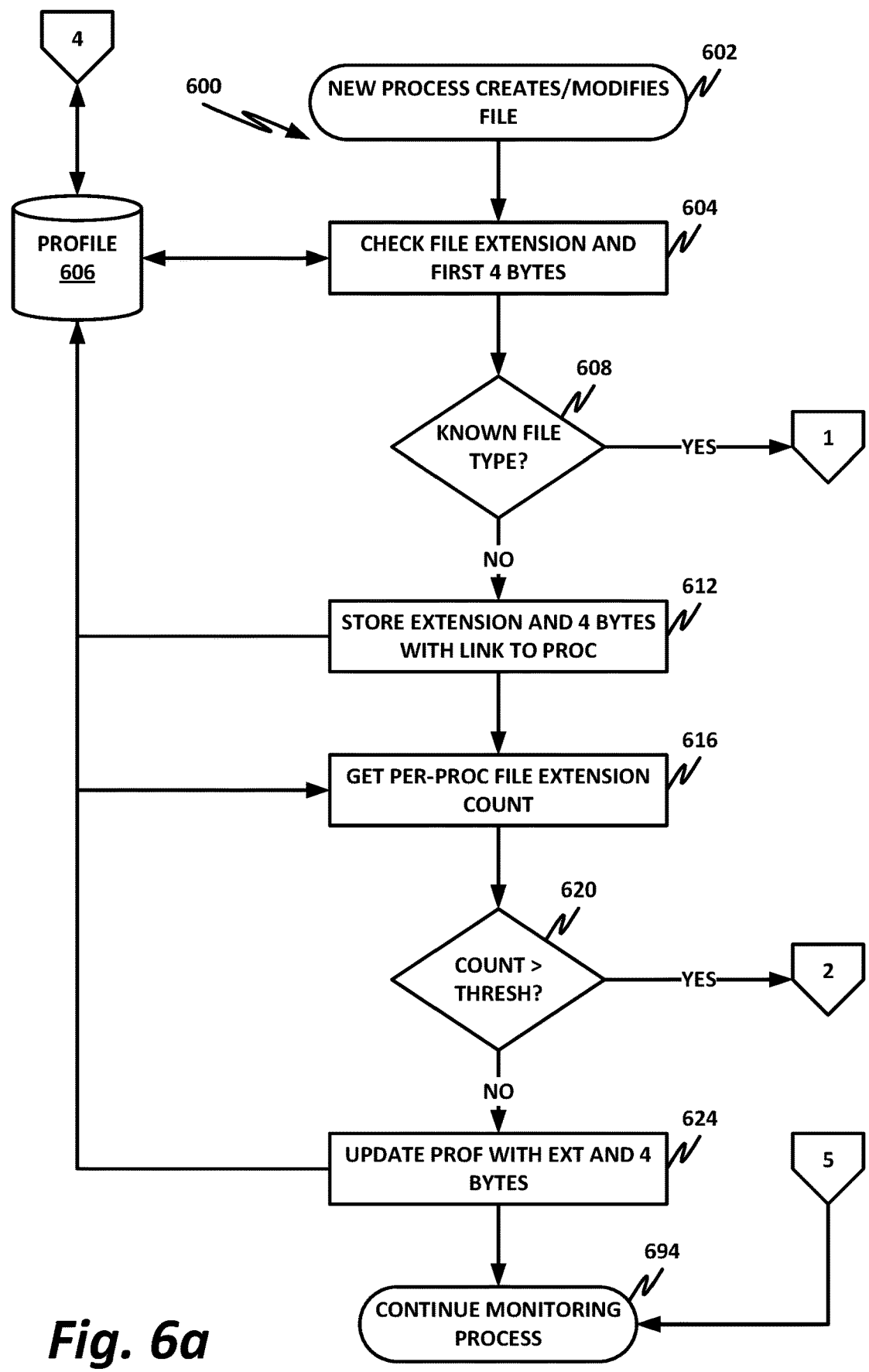
FIGS. 6a-6c illustrate a method that monitors for new processes that create or modify files on-disk.
Figure 6B:
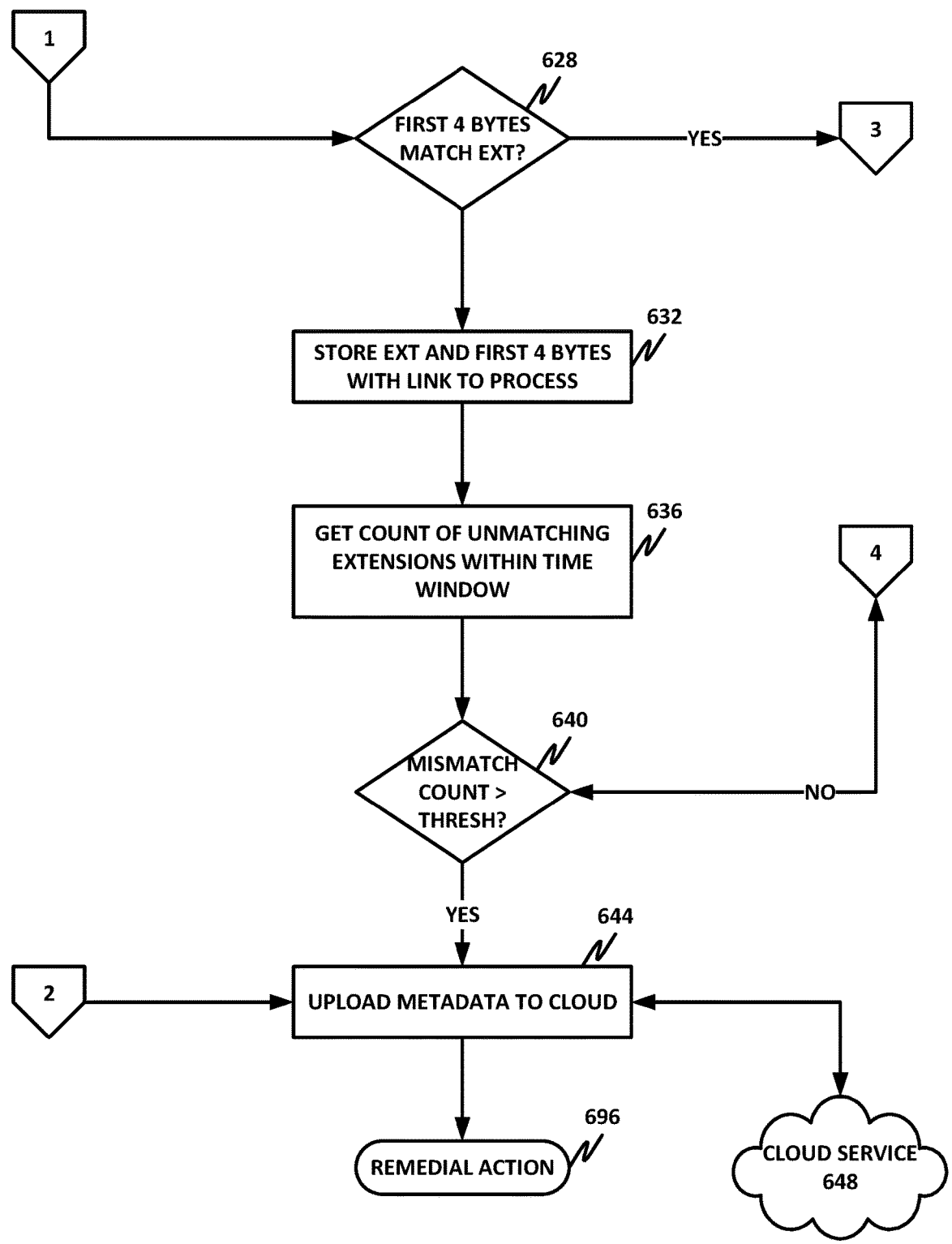
Figure 6C:
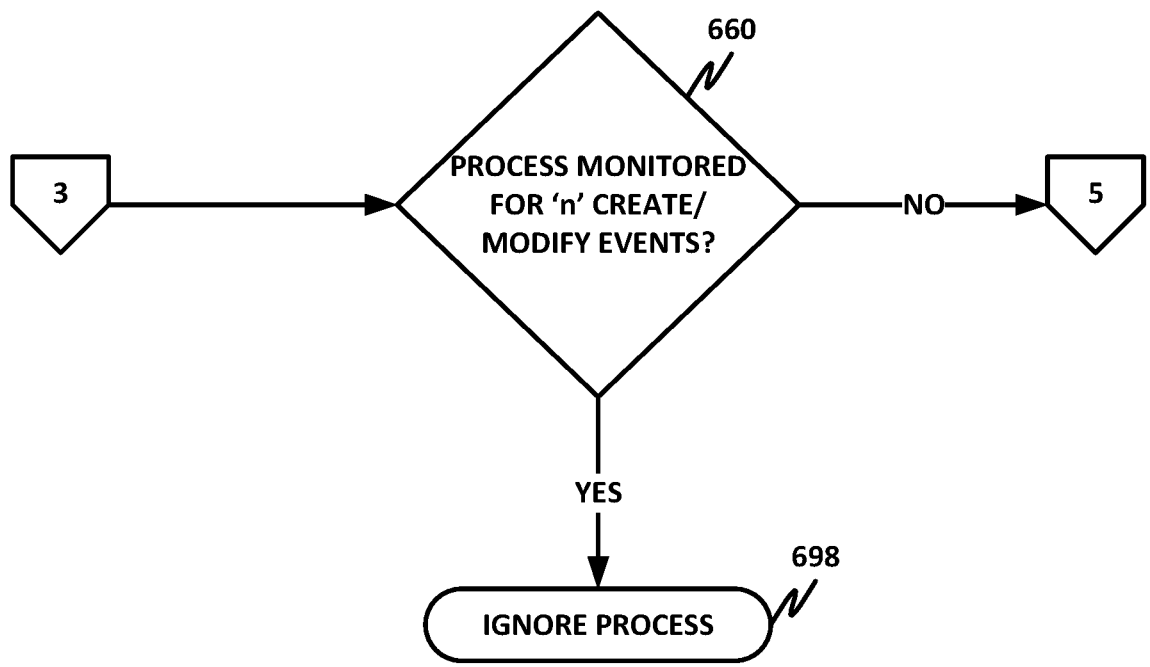

FIGS. 6a-6c illustrate a method 600 of monitoring for new processes that create or modify files on-disk. Once a file is created or modified, the ransomware detection engine may compare the file extension to the first four bytes of the file being created or modified, along with the frequency of this combination, against the profile store.

For example, profile store 606 may include process information, file extension, first four bytes, frequency of the combination encountered on the endpoint, and other data.

In one illustrative example, the ransomware detection engine identifies malware.exe in the path C:\malware.exe. This process has process ID (PID) 1234, and the first four bytes are \x25, \x50, \x44, and \x46. A final byte (\x20) represents the hexadecimal frequency.

These data may be stored for future checking or validation of the running process.

Method 600 includes at least two detection options.

In the first detection option, a file type shows up with an extension that has not been seen before on the system. In this case, it may be added to profile store 606, along with the PID that created the file extension and the first four bytes to provide the magic bytes for this file type. The system profile also stores the frequency with which this combination is encountered on the endpoint.

Still within the first detection option, if the process creates n number of file extensions above m frequency, a heuristic rule may be triggered. The process metadata may be submitted, for example, to a cloud service that can be used to protect other endpoints. The machine may then be isolated from the network for further investigation.

This detection method relies on the assumption that it is uncommon for a process to begin creating many new file extensions. Note, however, that this is not necessarily a reliable indicator of ransomware intent. If the detection turns out to be a false alarm, the system can be re-profiled to include these new file extensions, along with the first four bytes. In some embodiments, the process that created and modified the files may also be excluded from monitoring. This exclusion may be accomplished by mechanisms such as process name, image file, file extension, and/or increasing the frequency threshold.

In a second detection option, a file name extension has previously been seen on the endpoint under analysis. In this case, the ransomware detection engine compares the first four bytes of the created or modified file against the profile store. If these do not match, then the incident is compared to a threshold. If the number of incidents is above the threshold within a threshold time, the process metadata may be subjected to analysis, such as being submitted to a cloud service to analyze the process to determine whether it is malicious or ransomware. If the process is determined to be malicious, then again, remedial action may occur to protect the endpoint and other endpoints. For example, the endpoint may be isolated until further analysis can be performed. Thus, in one illustrative example of method 600, the detection method is initiated at block 602, when a new process creates or modifies a file.

In block 604, the ransomware detection engine checks the file extension and the first four bytes against a profile store 606. As described above, this could include, for example, hashing the first four bytes and using that hash as an index into a hash table that correlates to the named file extension (e.g., on a Microsoft Windows system the first four bytes of a tagged image file (TIF) should be \x49, \x49, \x2A, and \x00 for the little endian format).

Note that in some cases, the first four bytes themselves could be used as a hash or an index into a hash table. In other examples, a sample from the first four bytes, a fingerprint, or other data derived from the first four bytes may be used to query profile store 606, to determine whether the first four bytes match the file extension.

It should be noted that a mismatch is not necessarily an indication of a ransomware attack. For example, if a user wants to modify a configuration or a text file, he may wish to retain the original file as a failsafe in case the modification goes poorly. In that case, the user may rename the file with an extension such as .bak, .org, .old, or some other extension to indicate that this file is the original or baseline file, and not the newly modified version. Furthermore, when the user does this, the modified file names may not always be of the same type. For example, if the user wants to open a Microsoft Word document, she may rename the original from "mydocument.docx" to "mydocument.docx.bak." If she later wants to modify a ".ini" file with configuration data for a program, she may change "program.ini" to "program.ini.bak." In this case, both files have a .bak extension (indicating to the user that they are "backup" files), but they will have different magic bytes because one is a Microsoft Word document in a binary or extensible markup language (XML) format, while the other is a text file in a .ini or settings format. Thus, in some cases, the ransomware detection engine may be intelligent enough to observe this behavior and determine that the user is simply creating backup files, and in this case the .bak file name extension does not actually have any real significance. In some cases, certain extensions such as .bak, .org, .original, .old, .new, and similar may be identified as "dummy" extensions. In this case, the ransomware detection engine may use, instead, the penultimate period to identify the "true" file name extension (e.g., .docx for a .docx.old file).

In decision block 608, the engine determines whether the file type of the newly created file is a known file type.

If the file type is not a known file type, then in block 612, the engine may store the extension and the four bytes along with, optionally, a link to or identifier for the process that created the file with the unknown extension. These data may be stored in profile 606.

In block 616, the engine queries profile 606 to determine a per-process file extension count. This yields a count of either new file extensions, or new files with the new file extension, created by the process under analysis.

In decision block 620, the engine determines whether the count is above a threshold.

If the count is not above the threshold, then in block 624, the system updates the profile with the new extension and the first four bytes, or magic bytes, and treats this new extension as a new legitimate extension on the file system.

In this case, no ransomware attack has been detected, and in block 694, the system continues monitoring the process, or other processes. The linear flow from block 602 to block 694 represents the normal flow of the process when a ransomware attack does not occur. It is expected that this will be the most commonly encountered flow in a well-functioning system that has not been attacked. Other branches represent events that are more likely to stem from a ransomware attack.

Returning to decision block 608, if the file type for the file under analysis is not a known file type, then control follows off-page connector 1 to block 628 of FIG. 6b.

In block 628, the ransomware detection engine determines whether the first four bytes match the file name extension. Note that the first four bytes are disclosed by way of illustration only. While the first four bytes are a common example of a file signature, other numbers of bytes may be used. For example, RedHat package manager (RPM) files have a .rpm extension, and the first four bytes are "ed ab ee db." However, a zipped file (Lempel-Ziv-Welch algorithm, often also a .tar file) uses only two bytes ("1F 9D"). On the other hand, a SQLite3 database (.sqlitedb, .sqlite, or .db) uses 16 magic bytes. Furthermore, not every file format uses the first bytes. A minority of file types use offset bytes. For example, a PalmPilot database/document file (.pdb) includes 24 pairs of "00's" at offset 11.

While there may be some overlap, particularly in file formats that use more than four bytes, the first four bytes are generally pseudo-unique enough between file types to provide a useful identifier for detecting tampering. Thus, in at least some embodiments, the first four bytes are used, with the understanding that these may not represent the full file signature.

If the full or partial file signature (e.g., the first four bytes) match, then following off-page connector 3 to block 660, the system determines whether the process has been monitored for greater than or equal to n create/modify events. In this case, because the file names match, it is not of concern if the threshold of such file events is exceeded. Thus, in block 698, the process is ignored as being not likely a ransomware attack.

Returning to decision block 660, if the threshold of mismatched file events has not been exceeded, then following off-page connector 5 back to FIG. 6a, in block 694, the system continues monitoring the process.

Returning to decision block 628 of FIG. 6b, if the first four bytes do not match the file name extension, then a mismatch has been identified. Following off-page connector 3 to FIG. 6c, decision block 660 is encountered.

At decision block 660, the system determines whether the process has been monitored for greater than or equal to n create/modify events that have a mismatched file type in block 628. In other words, creating a single file with a mismatch is not necessarily a problem, as discussed above in the case of a user creating .bak or similar files. However, if a process creates a large number of mismatched files in a short time, this may be indicative of a potential ransomware attack. The specific threshold number, as well as the threshold time within which that number of files is to be created, may be determined heuristically based on the system profile.

In decision block 660, if the number of mismatched file extensions exceeds the threshold, then in block 698, the process is ignored.

In block 632, the extension is stored with the now mismatching four bytes, along with a link to or identifier of the process that created the mismatched file. This is so that the mismatches can be tracked.

In block 636, the system retrieves from profile store 606 a count of mismatched extensions within the given time window.

In decision block 640, the system determines whether the count of file extensions created by the process with the first four bytes mismatching the file extension exceeds a threshold. As described above, the threshold may be determined heuristically, based on the system profile.

If the mismatch count does not exceed the threshold, then following off-page connector 4 back to FIG. 6a, the mismatch is stored in profile store 606. Control may then pass to block 694 to continue monitoring the process.

Returning to decision block 640, if the number of mismatches exceeds the threshold for the time window, then in block 644, the system uploads metadata to a cloud service 648. This may be a cloud service provided by a security services vendor such as security services provider 190 of FIG. 1. Cloud service 648 may, in an illustrative embodiment, provide more detailed analysis. The metadata may be used by cloud service 648 to determine whether the event represents a likely ransomware attack.

Based on the response from cloud service 648, in block 696, the system may take remedial action. This remedial action could include, for example, disabling a network interface, or otherwise isolating the system under analysis. This could help to prevent the spread of infection to other devices in the network or within the enterprise. Remedial action could also include stopping the offending process, locking down files (e.g., marking them as read-only), providing notifications to the end user or an enterprise security administrator, or taking other remedial action. In some cases, the remedial action may lead to additional analysis by the end user or by a security administrator. If the additional analysis indicates that the attack is not a ransomware attack, then the identification is marked as a false positive. In this case, counter remedial action may be taken, such as updating profile store 606 with the file extension and magic bytes. This can help to prevent additional false positives in the future.

Returning now to decision block 620 of FIG. 6a, this decision represents a count of new files with a new file extension created by a process under analysis. In the previous description, the count did not exceed the threshold, so the process was not suspicious. However, in decision block 620, if the count does exceed the threshold (which may be heuristically determined within profile store 606 according to the system usage) then control follows off-page connector 2 to block 644 of FIG. 6b. As before, in block 644, cloud service 648 is queried with metadata about the suspected attack. Depending on the response from cloud service 648, remedial action may be taken in block 696.

Figure 7:
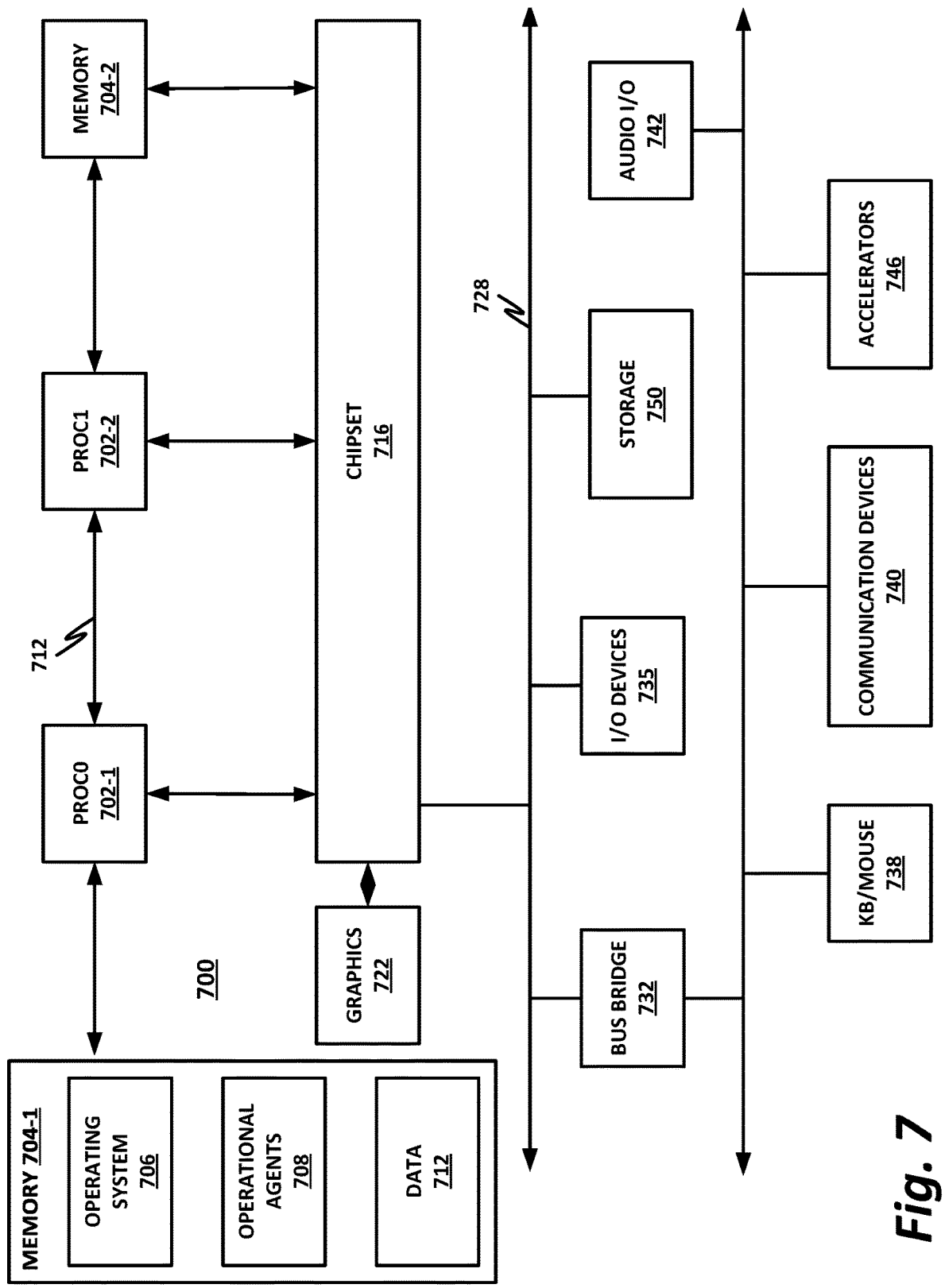
FIG. 7 is a block diagram of selected elements of a hardware platform.

FIG. 7 is a block diagram of a hardware platform 700. In at least some embodiments, selected elements of a ransomware protection engine may be provided within hardware platform 700, which may be configured or adapted according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Figure 9:
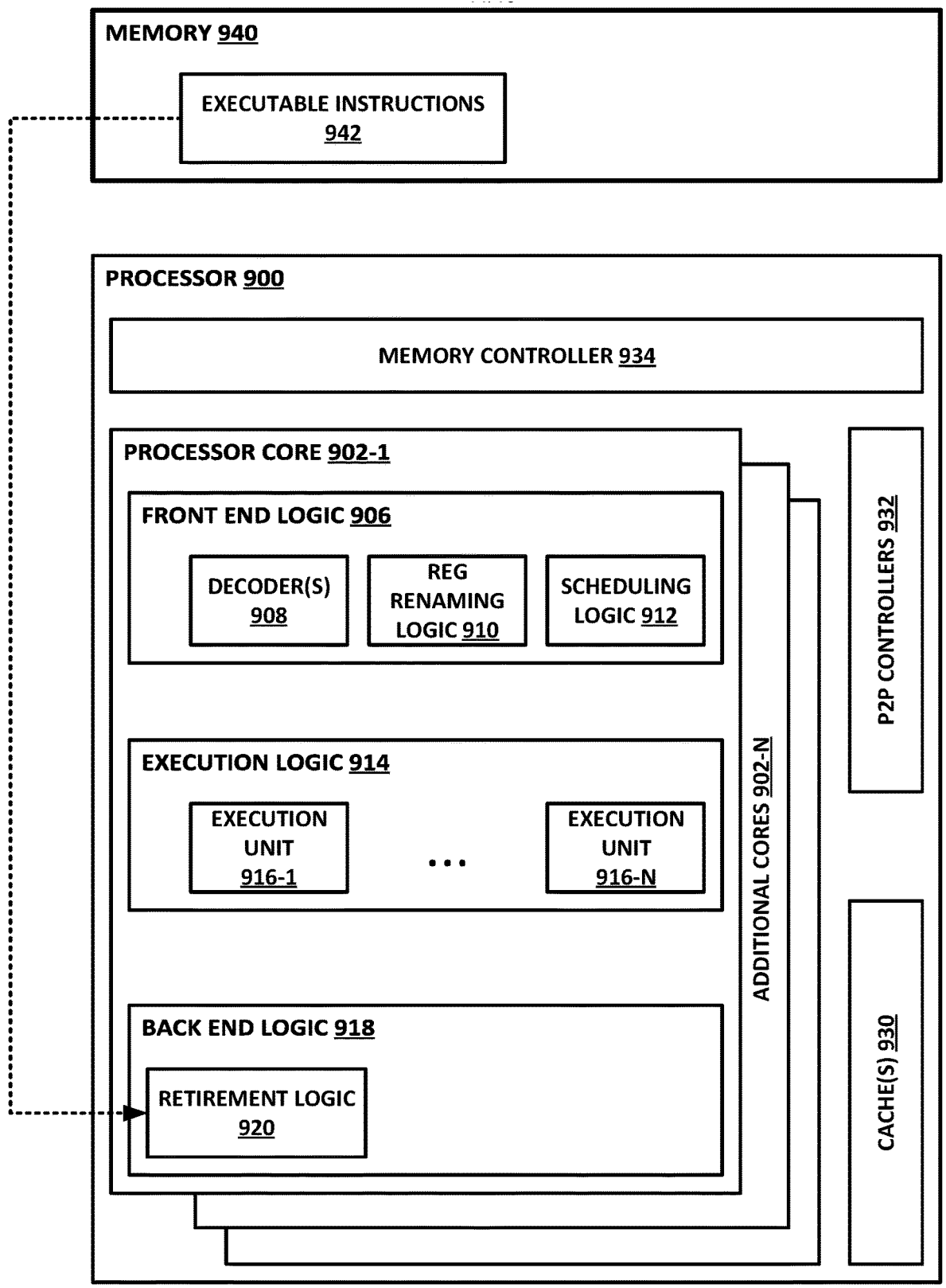
FIG. 9 is a block diagram of selected elements of a processor.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE, but one embodiment is illustrated in FIG. 9. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more central processing units (CPUs).

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with processor 710 via a bus. For example, some memories may be connected via a system bus, or in a data center, memory may be accessible in a remote DMA (RDMA) configuration.

Memory 704 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various universal serial bus (USB), FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, a data storage device 744, and/or accelerators 746. In alternative embodiments, any portions of the bus architectures could be implemented with one or more PtP links.

Operating system 706 may be, for example, Microsoft Windows, Linux, Unix, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more non-transitory computer-readable mediums having stored thereon executable instructions operable to instruct a processor to provide operational functions. At an appropriate time, such as upon booting hardware platform 700 or upon a command from operating system 706 or a user or security administrator, processor 702 may retrieve a copy of the operational agent (or software portions thereof) from storage 750 and load it into memory 704. Processor 710 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 8. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 8:
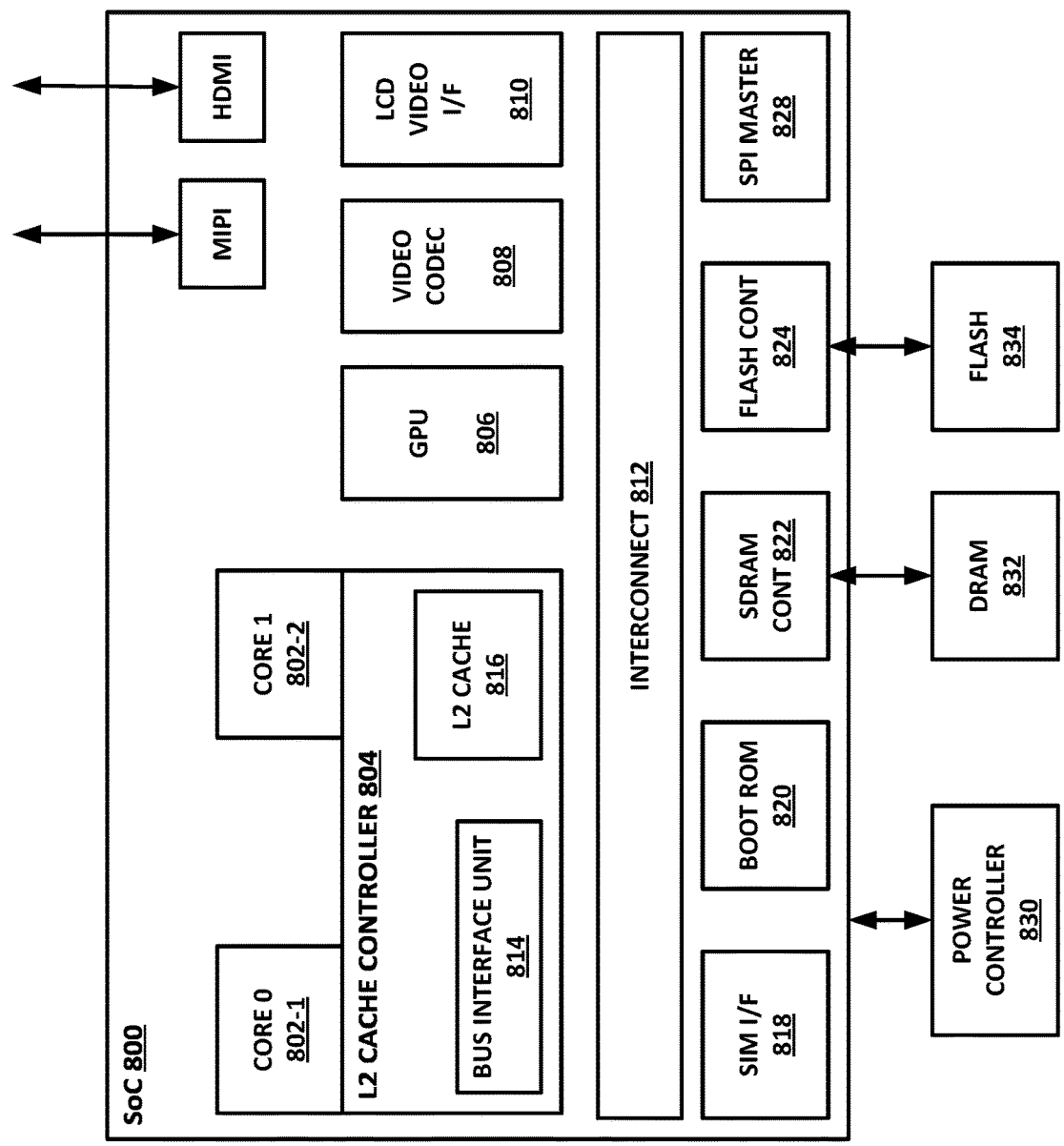
FIG. 8 is a block diagram of selected elements of a system-on-a-chip (SoC).

FIG. 8 is a block diagram illustrating selected elements of an example SoC 800. In at least some embodiments, selected elements of a ransomware protection engine may be provided within SoC 800, which may be configured or adapted according to the teachings of the present specification.

At least some of the teachings of the present specification may be embodied on an SoC 800, or may be paired with an SoC 800. SoC 800 may include, or may be paired with, an advanced reduced instruction set computer machine (ARM) component. For example, SoC 800 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 800 could also be integrated into, for example, a PC, server, video processing components, laptop computer, notebook computer, netbook, or touch-enabled device.

As with hardware platform 700 above, SoC 800 may include multiple cores 802a and 802b. In this illustrative example, SoC 800 also includes an L2 cache control 804, a GPU 806, a video codec 808, a liquid crystal display (LCD) I/F 810 and an interconnect 812. L2 cache control 804 can include a bus interface unit 814, a L2 cache 816. Liquid crystal display (LCD) I/F 810 may be associated with mobile industry processor interface (MIPI)/HDMI links that couple to an LCD.

SoC 800 may also include a subscriber identity module (SIM) I/F 818, a boot ROM 820, a synchronous dynamic random access memory (SDRAM) controller 822, a flash controller 824, a serial peripheral interface (SPI) master 828, a suitable power control 830, a dynamic RAM (DRAM) 832, and flash 834. In addition, one or more embodiments include one or more communication capabilities, interfaces, and features such as instances of Bluetooth 836, a 3G modem 838, a global positioning system (GPS) 840, and an 802.11 Wi-Fi 842.

Designers of integrated circuits such as SoC 800 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 9 is a block diagram illustrating selected elements of a processor 900. In at least some embodiments, selected elements of a ransomware protection engine may be provided within processor 900, which may be configured or adapted according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 900 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 900 includes one or more processor cores 902, including core 902-1-902-N. Cores 902 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 900 may include at least one shared cache 930, which may be treated logically as part of memory 940. Memory 940 may include executable instructions 942, as illustrated. Caches 930 may be filled according to known caching techniques, and may store instructions and/or data that may be used by one or more components of processor 900.

Processor 900 may include an integrated memory controller (MC) 934, to communicate with memory 940. Memory controller 934 may include logic and circuitry to interface with memory 940, and may also include a cache controller to handle filling and evicting instructions and data to and from cache 930.

By way of example, each core 902 may include front-end logic 906, execution logic 914, and backend logic 918.

In the illustrated embodiment, front-end logic 906 includes an instruction decoder or decoders 908, register renaming logic 910, and scheduling logic 912. Decoder 908 may decode instructions received. Register renaming logic 910 may provide register renaming, for example to facilitate pipelining. Scheduling logic 912 may schedule instruction execution, and may provide out-of-order (OOO) execution. Front-end logic 906 may fetch incoming instructions, perform various processing (e.g., caching, decoding, branch predicting, etc.), and pass instructions to execution logic 914.

Execution logic 914 includes one or more execution units 916-1-916-N. Execution units 916 may include hardware instructions and microcode to carry out the provided instructions.

Backend logic 918 includes retirement logic 920. Core 902 may provide for speculative execution of instructions, branch prediction, and similar. Retirement logic 920 may be configured to determine which predicted instructions were actually needed by the program flow.

Processor 900 may also include a PtP controller 932, which enables connection to an uncore, chipset, Northbridge, Southbridge, or bus, by way of example.

Figure 10:
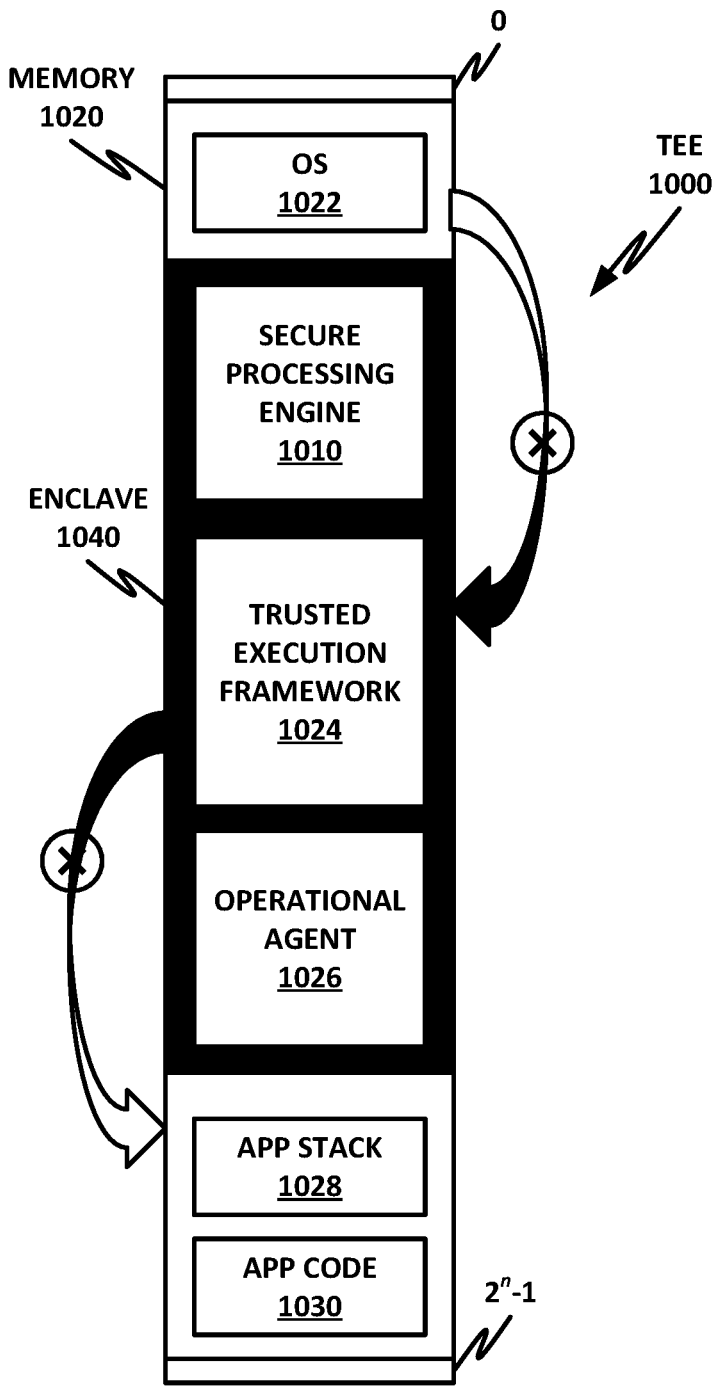
FIG. 10 is a block diagram of selected elements of a trusted execution environment (TEE).

FIG. 10 is a block diagram of a trusted execution environment (TEE) 1000. In at least some embodiments, selected elements of a ransomware protection engine may be provided within TEE 1000. This helps to ensure that ransomware or other malware cannot tamper with the ransomware protection engine itself.

In the example of FIG. 10, memory 1020 is addressable by n-bits, ranging in address from 0 to $2^n-1$ (note, however, that in many cases, the size of the address space may far exceed the actual memory available). Within memory 1020 is an OS 1022, enclave 1040, application stack 1028 and application code 1030.

In this example, enclave 1040 is a specially-designated portion of memory 1020 that cannot be entered into or exited from except via special instructions, such as Intel Software Guard Extensions (SGX) or similar. Enclave 1040 is provided as an example of a secure environment which, in conjunction with a secure processing engine 1010, forms a TEE 1000 on a hardware platform such as platform 700 of FIG. 7. A TEE 1000 is a combination of hardware, software, and/or memory allocation that provides the ability to securely execute instructions without interference from outside processes, in a verifiable way. By way of example, TEE 1000 may include memory enclave 1040 or some other protected memory area, and a secure processing engine 1010, which includes hardware, software, and instructions for accessing and operating on enclave 1040. Nonlimiting examples of solutions that either are or that can provide a TEE include Intel SGX, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1010 may be a user-mode application that operates via trusted execution framework 1024 within enclave 1040. TEE 1000 may also conceptually include processor instructions that secure processing engine 1010 and trusted execution framework 1024 require to operate within enclave 1040.

Secure processing engine 1010 and trusted execution framework 1024 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1022 may be excluded from TCB, in addition to the regular application stack 1020 and application code 1030.

In certain systems, computing devices equipped with Intel SGX or equivalent instructions may be capable of providing an enclave 1040. It should be noted, however, that many other examples of TEEs are available, and TEE 1000 is provided only as one example thereof. Other secure environments may include, by way of nonlimiting example, a virtual machine, sandbox, testbed, test machine, or other similar device or method for providing a TEE 1000.

In an example, enclave 1040 provides a protected memory area that cannot be accessed or manipulated by ordinary computer instructions. Enclave 1040 is described with particular reference to an Intel SGX enclave by way of example, but it is intended that enclave 1040 encompass any secure processing area with suitable properties, regardless of whether it is called an "enclave."

One feature of an enclave is that once an enclave region 1040 of memory 1020 is defined, as illustrated, a program pointer cannot enter or exit enclave 1040 without the use of special enclave instructions or directives, such as those provided by Intel SGX architecture. For example, SGX processors provide the ENCLU[EENTER], ENCLU[ERESUME], and ENCLU[EEXIT]. These are the only instructions that may legitimately enter into or exit from enclave 1040.

Thus, once enclave 1040 is defined in memory 704, a program executing within enclave 1040 may be safely verified to not operate outside of its bounds. This security feature means that secure processing engine 1010 is verifiably local to enclave 1040. Thus, when an untrusted packet provides its content to be rendered with trusted execution framework 1024 of enclave 1040, the result of the rendering is verified as secure.

Enclave 1040 may also digitally sign its output, which provides a verifiable means of ensuring that content has not been tampered with or modified since being rendered by secure processing engine 1010. A digital signature provided by enclave 1040 is unique to enclave 1040 and is unique to the hardware of the device hosting enclave 1040.

Figure 11:
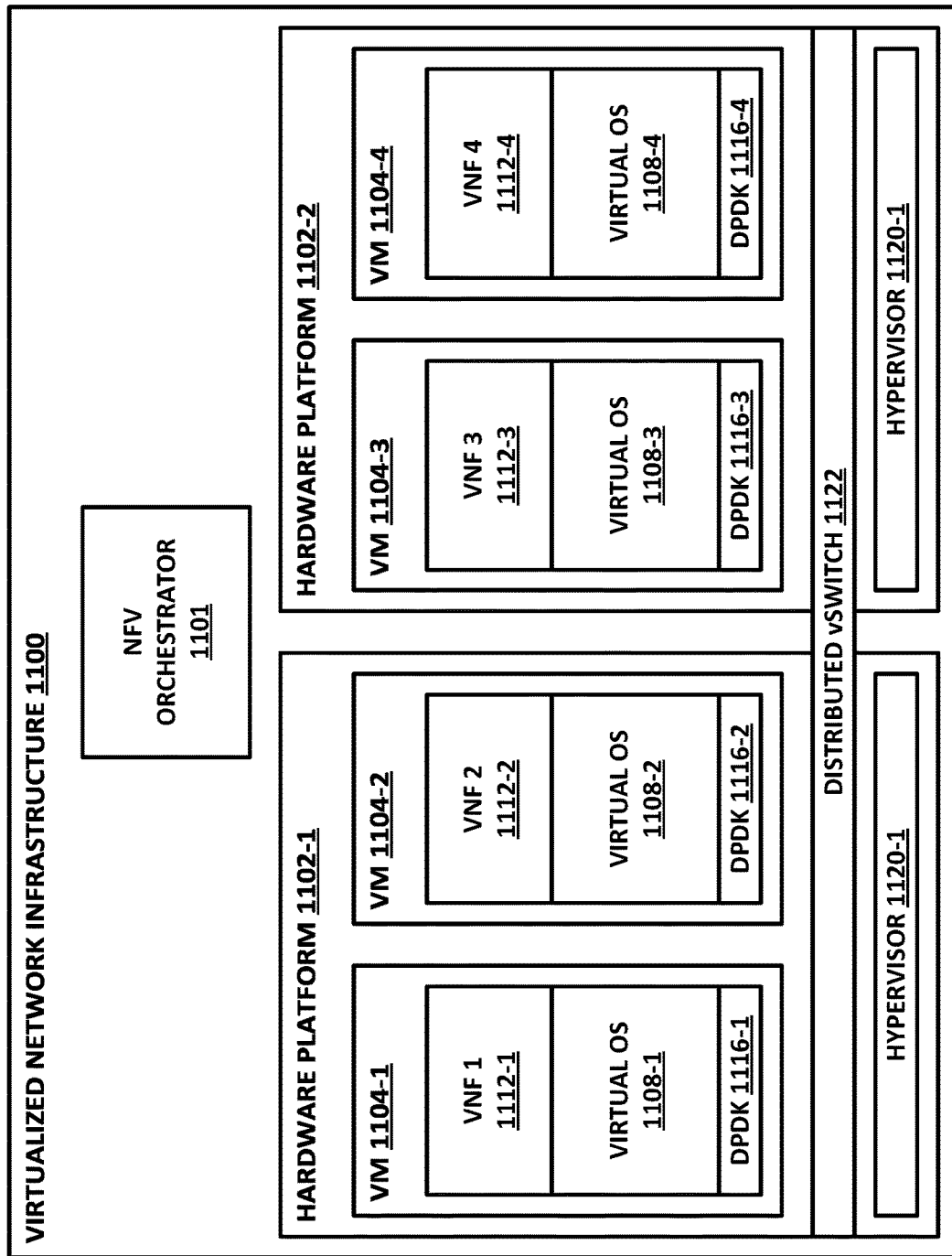
FIG. 11 is a block diagram of selected elements of a network function virtualization (NFV) infrastructure.

FIG. 11 is a block diagram of a network function virtualization (NFV) infrastructure 1100. In at least some embodiments, selected server-side or cloud-based elements of the system and architecture for ransomware mitigation described herein may be provided on a virtualized network infrastructure.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications services. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100.

This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a hardware platform comprising a processor and a memory; a system profile store; and a ransomware detection engine comprising instructions encoded within the memory to instruct the processor to: detect an operation, by a process, that results in an operation on a file, wherein the operation comprises newly creating the file including a file type identifier, or where the file is an existing file, changing a file type identifier for the file; querying the system profile store with a combination of the file type identifier and metadata about the file; based at least in part on the querying, determining that the process is a suspected ransomware attack; and taking a remedial action.

There is further disclosed an example computing apparatus, wherein determining that the process is a suspected ransomware attack comprises determining that the file type identifier is a file type identifier not previously profiled in the system profile store, and that the process has created a number of files of the file type exceeding a threshold within a threshold time.

There is further disclosed an example computing apparatus, wherein the file type identifier is a file extension following a final dot (".") in the file's name, and wherein the metadata comprises a file signature.

There is further disclosed an example computing apparatus, wherein the file signature comprises all or part of the file's first four bytes.

There is further disclosed an example computing apparatus, wherein determining that the process is a suspected ransomware attack comprises identifying a mismatch between the file extension and the file signature.

There is further disclosed an example computing apparatus, wherein the instructions are further to exclude a mismatch because the file extension is included in an ignore list.

There is further disclosed an example computing apparatus, wherein the instructions are further to use characters following a penultimate dot (".") as the file extension.

There is further disclosed an example computing apparatus, wherein identifying a mismatch between the file extension and the file signature comprises identifying a plurality of mismatches exceeding a threshold within a threshold time.

There is further disclosed an example computing apparatus, wherein the file signature comprises a hash of the file's first four bytes.

There is further disclosed an example computing apparatus, wherein the system profile store comprises a hash table of file extensions, and wherein the hash of the file signature is a key into the hash table.

There is further disclosed an example computing apparatus, wherein the system profile store further comprises heuristic data for the computing apparatus.

There is further disclosed an example computing apparatus, wherein the remedial action comprises isolating the computing apparatus.

There is further disclosed an example computing apparatus, wherein isolating the computing apparatus comprises disabling a network interface.

There is further disclosed an example computing apparatus, wherein isolating the computing apparatus comprises notifying an enterprise security administrator or user.

There is further disclosed an example computing apparatus, wherein the instructions are further to receive a notification that the detection is a false positive, and add the file type identifier to the system profile store.

There is further disclosed an example computing apparatus, wherein determining that the process is a suspected ransomware attack comprises querying a cloud security service with metadata about the system and the process.

There is also disclosed an example of one or more tangible, non-transitory computer-readable storage media having stored thereon executable instructions to: profile a computing system to create a system profile; monitor a process on the computing system; determine that the process has created a suspicious file extension; query a cloud security service for a reputation for the process, wherein the query comprises metadata related to the process and the unrecognized file type; receive from the cloud security a service a reputation for the process, wherein the reputation includes that the process is a probably ransomware attack; and initiate a remedial action against the process.

There is further disclosed an example of one or more tangible, non-transitory computer-readable media, wherein determining that the process has created a suspicious file extension comprises determining that the file extension is a file type extension not found in the system profile, and that the process has created a number of files with the file extension exceeding a threshold within a threshold time.

There is further disclosed an example of one or more tangible, non-transitory computer-readable media, wherein determining that the process has created a suspicious file extension comprises comparing all or part of the file's first four bytes with magic bytes associated with the file extension in the system profile.

There is further disclosed an example of one or more tangible, non-transitory computer-readable media, wherein determining that the process has created a suspicious file extension comprises identifying a mismatch between the file extension and a file signature for the file.

There is further disclosed an example of one or more tangible, non-transitory computer-readable media, wherein the instructions are to exclude a mismatch because the file extension is included in an ignore list.

There is further disclosed an example of one or more tangible, non-transitory computer-readable media, wherein the instructions are further to use characters following a penultimate dot (".") as the file extension.

There is further disclosed an example of one or more tangible, non-transitory computer-readable media, wherein identifying the mismatch comprises identifying a plurality of mismatches exceeding a threshold within a threshold time.

There is further disclosed an example of one or more tangible, non-transitory computer-readable media, wherein the system profile comprises a file signature comprising all or part of the file's first four bytes.

There is further disclosed an example of one or more tangible, non-transitory computer-readable media, wherein the system profile comprises a hash of the file's first four bytes.

There is further disclosed an example of one or more tangible, non-transitory computer-readable media, wherein the system profile store comprises a hash table of file extensions, and wherein the hash of the file signature is a key into the hash table.

There is further disclosed an example of one or more tangible, non-transitory computer-readable media, wherein the system profile further comprises heuristic data for the computing system.

There is further disclosed an example of one or more tangible, non-transitory computer-readable media, wherein initiating the remedial action comprises isolating the computing system.

There is further disclosed an example of one or more tangible, non-transitory computer-readable media, wherein isolating the computing system comprises disabling a network interface.

There is further disclosed an example of one or more tangible, non-transitory computer-readable media, wherein isolating the computing system comprises notifying an enterprise security administrator or user.

There is further disclosed an example of one or more tangible, non-transitory computer-readable media, wherein the instructions are further to receive a notification that the detection is a false positive, and add the file type identifier to the system profile store.

There is also disclosed a computer-implemented method, comprising: creating a system profile for a computing system, the system profile comprising a table of file name extensions correlated with magic bytes for the file name extensions, and further comprising heuristic data according to usage patterns for the computing system; determining that a process has, within a threshold time span according to the heuristic data, created a number of files having a suspicious file extension, the number of files exceeding a number threshold according to the heuristic data; querying a remote security server with information about the process and the suspicious file extension; receiving from the remote security server a notification that the process is suspected ransomware; and mitigating the suspected ransomware process.

There is further disclosed an example method, further comprising determining that the suspicious file extension is a file type extension not found in the system profile.

There is further disclosed an example method, further comprising comparing all or part of a file's first four bytes with the magic bytes of the system profile.

There is further disclosed an example method, further comprising identifying a mismatch between the suspicious file extension and the magic bytes of the system profile.

There is further disclosed an example method, further comprising excluding a mismatch because the file extension is included in an ignore list.

There is further disclosed an example method, further comprising using characters following a penultimate dot (".") as the file extension.

There is further disclosed an example method, wherein the magic bytes of the system profile are a first four bytes expected for a file matching the correlated file extension.

There is further disclosed an example method, wherein the magic bytes of the system profile are a hash of a first four bytes expected for a file matching the correlated file extension.

There is further disclosed an example method, wherein the hash is an index into a hash table of the system profile.

There is further disclosed an example method, wherein mitigating the suspected ransomware process comprises isolating the computer system.

There is further disclosed an example method, wherein isolating the computing system comprises disabling a network interface.

There is further disclosed an example method, wherein isolating the computing system comprises notifying an enterprise security administrator or user.

There is further disclosed an example method, further comprising receiving a notification that the detection is a false positive, and adding the suspicious file extension to the system profile.

There is further disclosed an example apparatus, comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus, comprising:
a processor circuit and a memory; and
instructions encoded within the memory to instruct the processor circuit to:
scan a plurality of files of computing apparatus, and for respective files, identify a first filename extension, and a first four-byte sequence that corresponds to the first filename extension, and store the first filename extensions and identifying information for the first four-byte sequences in a data structure;
determine that a process has, within a temporal window, changed a number of existing files exceeding a threshold, wherein determining that the process has changed an existing file comprises detecting that the process has changed a file extension for the existing file to a second filename extension different from the first filename extension, and that a second four byte sequence for the changed file is different from the first four-byte sequence; and
based on the determining, taking a ransomware remediation action.

2. The computing apparatus of claim 1, wherein at least some filename extensions follow a final dot (".") in a file's name.

3. The computing apparatus of claim 1, wherein the four-byte sequences are a first four bytes of a file.

4. The computing apparatus of claim 1, wherein the instructions are further to exclude a based on determining that the first filename extension for the changed file is included in an ignore list.

5. The computing apparatus of claim 1, wherein the instructions are further to use characters following a penultimate dot (".") as a filename extension.

6. The computing apparatus of claim 1, wherein determining that the process has changed an existing file comprises comparing a hash of the first four-byte sequence to a hash of the second four byte sequence.

7. The computing apparatus of claim 1, wherein the identifying information comprises a hash of a four byte sequence.

8. The computing apparatus of claim 1, wherein the data structure further comprises heuristic data for the computing apparatus.

9. The computing apparatus of claim 1, wherein the ransomware remediation action comprises isolating the computing apparatus by disabling a network interface.

10. The computing apparatus of claim 1, wherein the instructions are further to query a cloud security service with metadata about the computing apparatus and the process.

11. One or more tangible, non-transitory computer-readable storage media having stored thereon executable instructions to:
scan a plurality of files of computing apparatus, and for respective files, identify a first filename extension, and a first four-byte sequence that corresponds to the first filename extension, and store the first filename extensions and identifying information for the first four-byte sequences in a data structure;
determine that a process has, within a temporal window, changed a number of existing files exceeding a threshold, wherein determining that process has changed an existing file comprises detecting that the process has changed a file extension for the existing file to a second filename extension different from the first filename extension, and a second four byte sequence for the changed file is different from the first four-byte sequence; and
based on the determining, taking a ransomware remediation action.

12. The one or more tangible, nontransitory computer-readable storage media of claim 11, wherein at least some filename extensions follow a final dot (".") in a file's name.

13. The one or more tangible, nontransitory computer-readable storage media of claim 11, wherein the four-byte sequences are a first four bytes of a file.

14. The one or more tangible, nontransitory computer-readable storage media of claim 11, wherein the instructions are further to exclude a file based on determining that the first filename extension for the changed file is included in an ignore list.

15. The one or more tangible, nontransitory computer-readable storage media of claim 11, wherein the instructions are further to use characters following a penultimate dot (".") as a filename extension.

16. The one or more tangible, nontransitory computer-readable storage media of claim 11, wherein determining that the process has changed an existing file comprises comparing a hash of the first four-byte sequence to a hash of the second four byte sequence.

17. The one or more tangible, nontransitory computer-readable storage media of claim 11, wherein the identifying information comprises a hash of a four byte sequence.

18. The one or more tangible, nontransitory computer-readable storage media of claim 11, wherein the data structure further comprises heuristic data for a computing apparatus.

19. A computer-implemented method, comprising:
creating a system profile for a computing system, the system profile comprising a table of file name extensions correlated with magic bytes for the file name extensions, wherein the magic bytes comprise a sequence of a first four bytes for a file name extension, and further comprising heuristic data according to usage patterns for the computing system;

determining that a process has, within a threshold time span according to the heuristic data, created a number of files having a suspicious file extension, the number of files exceeding a number threshold according to the heuristic data, wherein the suspicious file extension is a file extension that did not appear in the system profile before the number of files were created;

querying a remote security server with information about the process and the suspicious file extension;

receiving from the remote security server a notification that the process is suspected ransomware; and mitigating the suspected ransomware.

20. The method of claim 19, further comprising determining that the suspicious file extension is a file type extension not found in the system profile.

* * * * *